United States Patent [19]

Hinnrichs et al.

[11] Patent Number: 5,479,258

[45] Date of Patent: Dec. 26, 1995

[54] IMAGE MULTISPECTRAL SENSING

[75] Inventors: Michele Hinnrichs, Solvang, Calif.;
George M. Morris, Fairport, N.Y.

[73] Assignee: Pat Industries, Solvang, Calif.

[21] Appl. No.: 320,776

[22] Filed: Oct. 12, 1994

Related U.S. Application Data

[60] and a continuation-in-part of Ser. No. 998,785, Dec. 28, 1992, abandoned.

[51] Int. Cl.$^6$ ........................................................ G01J 3/28
[52] U.S. Cl. ................................................. 356/326; 356/300
[58] Field of Search ................................... 356/326, 328, 356/330–334, 300; 250/226

[56] References Cited

U.S. PATENT DOCUMENTS

| | | | |
|---|---|---|---|
| 4,705,396 | 11/1987 | Bergström | 356/332 |
| 4,742,222 | 5/1988 | Rétfalvy et al. | 356/332 |

OTHER PUBLICATIONS

"Charge–Injection and Charge–Coupled Devices in Practical Chemical Analysis" Denton et al, American Chemical Society, 1983.

*Primary Examiner*—Vincent P. McGraw
*Assistant Examiner*—K. P. Hantis
*Attorney, Agent, or Firm*—Michael G. Petit

[57] ABSTRACT

A spectrophotometer useful for spectral analysis of light emanating from one or more targets within an image is described. The apparatus comprises a diffractive lens having an optical axis, a planar array of photodetector elements (pixels), a means for changing the distance between the photodetector array and the diffractive lens along the optical axis and a signal processor. If either the photodetector array or the lens is moved along the optical axis, different wavelengths of light from each target within the image come into and out of focus on particular photodetector elements in the plane of the photodetector array generating sequential images corresponding to different wavelengths. By tracking each pixel's output in the photodetector array as a function of lens position relative to the photodetector array, the spectral composition of each target within the image is generated. Background (non-target) radiation will generally appear as a broad spectrum while light emanating from targets will have a fine spectral signature which is easily differentiated from the background. The sequential images from the photodetector array are processed so that only discrete spectral components are retained for each photodetector array position. Each target's spectrum is built up from sequential images and may be compared with a library of known target signatures for purposes of recognition.

3 Claims, 8 Drawing Sheets

IMAGE MULTISPECTRAL SENSING

CROSS REFERENCE TO RELATED APPLICATIONS

This is a continuation-in-part of application Ser. No. 07/998,785; filed 28 Dec. 1992 now abandoned.

BACKGROUND OF THE INVENTION

1. Field of the Invention

This invention is directed toward the field of spectral signature sensors useful for target recognition and more particularly, the invention provides a method and an apparatus for performing spectral recordation of images for the purpose of identification, matching or storage.

2. Prior Art

Spectrophotometers (color meters) are widely used in the area of target recognition. The principle of recognition is that different targets reflect, emit or absorb light differently. Alternatively, different targets represent independent light sources, each target having an observable spectra which is particular to that target. Baird, in U.S. Pat. No. 3,343,448 describes a spectroscopic apparatus useful for analyzing the emission spectrum of an object positioned along the optical axis of a reflecting zone plate. Baird's apparatus has means for excitation of a sample located along the optical axis of the apparatus. The sample, once excited, emits light having a characteristic sample-specific spectrum which is gathered and collimated by a reflecting lens and brought to focus on the reflecting zone plate. The reflecting zone plate is analogous to a diffraction grating in which dispersion of reflected light occurs along the optic axis. The emission spectrum emanating from the sample is reflected from the zone plate and brought to focus on a photodetector, which also lies along the optic axis and which is capable of motion with respect to the reflecting zone plate. The various colors comprising the emission spectrum are brought to focus at different points along the optic axis, depending upon the color. Thus, the position of the translating detector with respect to the reflecting zone plate together with the signal out of the photodetector provides a measure of the emission spectrum of the sample.

One difficulty with employing the Baird-type of apparatus to target recognition, in general, is that to avoid light loss the target must lie along the optic axis defined by the reflective zone plate and concave mirror. More particularly, since the Baird apparatus utilizes reflective optical elements, the source or target must lie between the reflecting mirror and the reflecting zone plate. Such an optical construction is not operable for analyzing the spectrum of light emanating from a remote object or target or a group of such targets within a field of interest.

U.S. Pat. No. 4,742,222 to Retfalvy et. al. discloses a device which employs the longitudinal chromatic aberration of a dispersive lens to separate light from a single "point-like" source (having a narrow predetermined wavelength range and angled field of vision) from the background signals due to other light sources that have a different wavelength range and/or a different field of view. In this device, an aperture is placed between the light collection system and a detector. The longitudinal distance between the optical collector and the aperture surface, together with the aperture size determines the center wavelength and spectral bandwidth, respectively, of the predetermined wavelength range. The lateral displacement of the aperture from the optical axis determines the field of vision for the system. The device is operable only for detecting a single point-like source that emits light in a narrow wavelength range. Further, there is no means presented for processing the image as, for example, to identify the source.

In U.S. Pat. No. 4,705,396 to Bergstrom, Bergstrom describes an image monochromator arranged to receive light at an input simultaneously from an entire object field to be viewed and to produce a viewable image of the entire object field simultaneously at a selected wavelength band. The apparatus combines an imaging lens and a monochromator from the prior art to obtain images in different wavelength ranges. The purpose of the diffraction grating (diffractive element) is to displace the images formed in the different wavelengths in a lateral direction, i.e., the displacement lies in a plane that is perpendicular to the optical axis. By itself, the (prior art) imaging lens can form an image, but cannot form distinct images in different wavelength ranges. On the other hand, the (prior art) monochromator can only distinguish the spectral composition of the point-like object, located at a specific field of view. The invention combines these prior art elements to provide a means for forming distinct wide-field images in different spectral ranges.

A color signature sensor for analyzing the spectrum of light reflected from the surface of a remote object is described in U.S. Pat. No. 4,954,972 to Sullivan. This apparatus employs a lamp to irradiate the object and a pick up fiber optic to conduct the light reflected from the object to a diffraction grating. The diffraction grating receives the light from the fiber optic and disperses it, bringing it to focus on a substantially linear detector array. The detector array comprises individual photosensitive pixels which are sampled and analyzed to reconstruct the spectral image of the object.

Image multi-spectral sensing (IMSS) differs from the foregoing devices in that it records the spectrum of individual targets within an image or scene. It is capable of simultaneously recording the spectrum of many different points or targets within an image or a field of view. It is desirable to have an apparatus which is compact and is suitable for simultaneously analyzing the spectral composition of light emanating from one or more targets within an image.

SUMMARY OF THE INVENTION

In view of the foregoing limitations of prior art spectral sensors, it is an object of this invention to provide a spectrophotometric apparatus for measuring the spectral composition of infrared, visible or ultraviolet light emanating from remote targets within a field of view.

It is yet another object of this invention to provide a spectrophotometric apparatus which is capable of simultaneously discerning the spectral composition of light emanating from multiple objects (targets) within an image.

It is still another object of this invention to provide a spectrophotometric apparatus which is capable of measuring the reflection, absorption or emission spectrum from a remote target that is relatively light, compact and portable.

It is another object of this invention to provide a spectrophotometric apparatus which can compare the characteristic spectrum of light (color signature) emanating from unknown target objects with the color signature of known objects to enable target recognition.

The present invention describes an apparatus and method for measuring the spectral composition of an image in accordance with the aforesaid objects of the invention. The apparatus consists of (a): a diffractive element for dispersing spectral components in an image into a volume having an area (A) and a length (L); (b): a photodetector array having an area substantially equal to (A); (c): means for changing the distance between the diffractive element and the photodetector array along the optical axis; and (d): computer means for recording the distance between the diffractive element and the photodetector array and measuring the intensity of the light impinging on discrete elements of the photodetector array as a function of distance between the photodetector array and diffractive element. The apparatus has means thereon for varying the distance (L) between the photodetector array and the diffractive element. For any particular position $L_1$, $L_2$, $L_n$, different photodetectors in the array are going to respond to that portion of the image falling thereon. For each position ($L_i$), each of the discrete photodetectors in the array are addressed and their signal is read by computer means. The process is iterated for reasonable values of L until the portion of the spectrum of interest is brought sequentially into focus on the photodetector array. The spectral composition of the image can then be determined by combined the images for each position along L. The diffractive focusing element may be either a transmissive lens such as a fresnel lens, a transmission grating or a blazed grating or could be a reflective dispersive element such as a diffraction grating or a reflection-coated diffraction grating (a diffracting mirror).

These and other aspects of the invention will soon become apparent as we turn to a description of the preferred embodiment.

DESCRIPTION OF THE PREFERRED EMBODIMENT

Figure 1:
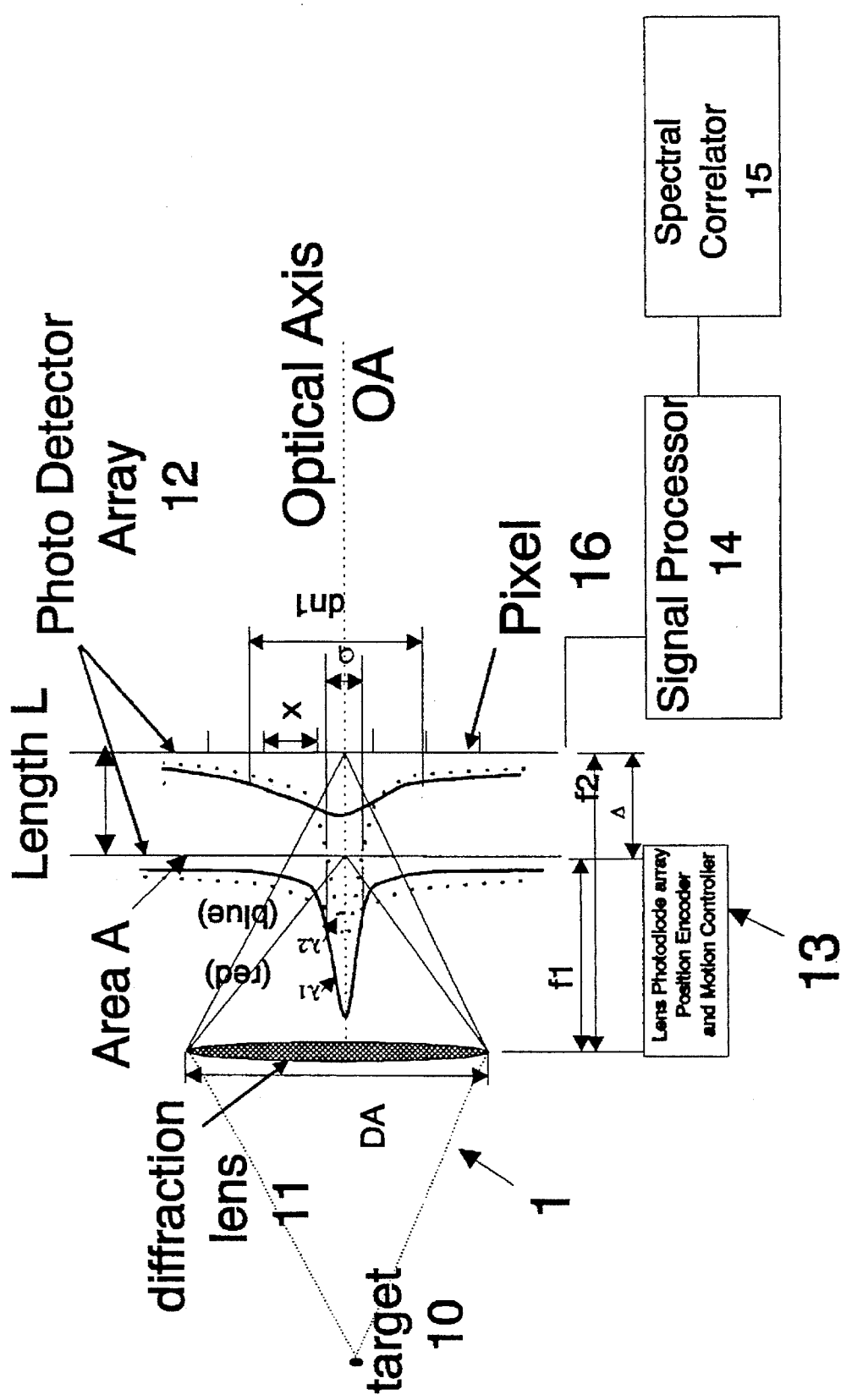
FIG. 1 demonstrates how the dispersion of light from a target by a transmissive Fresnel lens brings different colors to focus at different points along the optic axis.
Figure 2A:
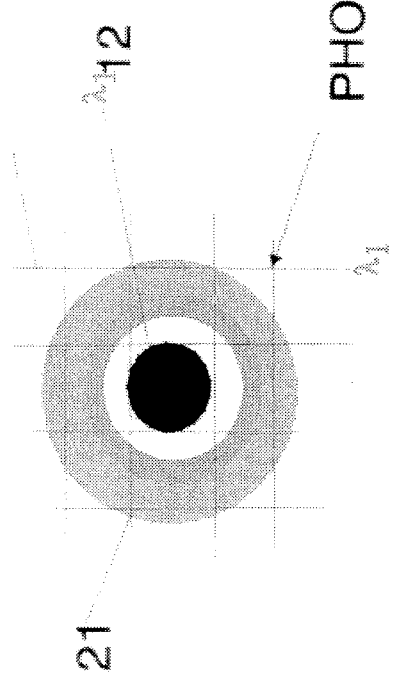
FIGS. 2(a) and 2(b) illustrate the spectral resolution of image multispectral sensing with respect to wavelength and background.
Figure 2B:
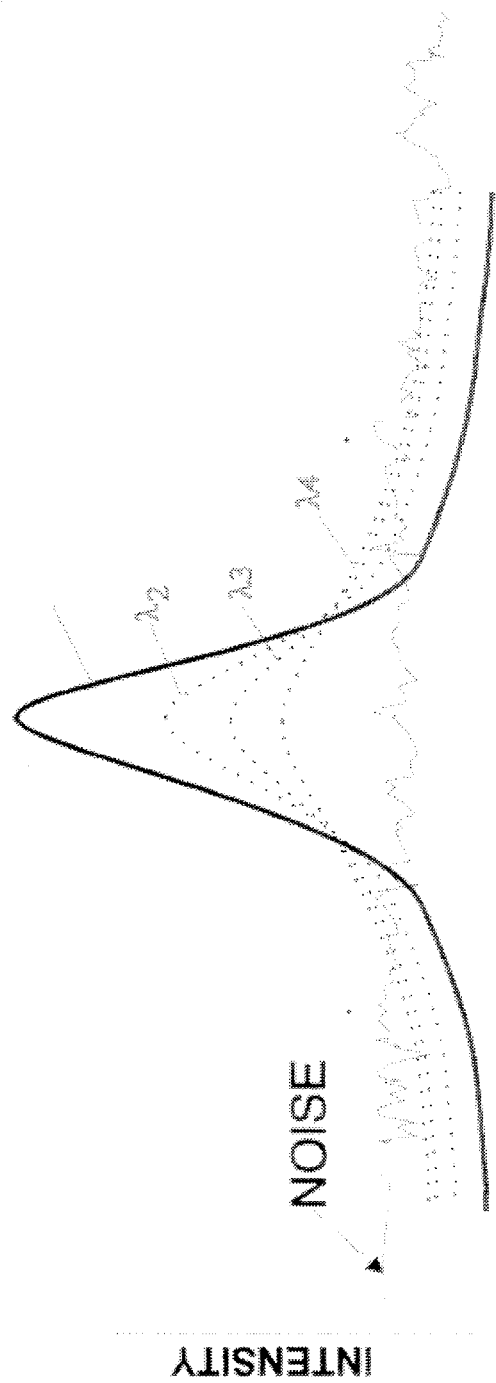

A graphic illustration of the theory behind IMSS is shown in FIGS. 1 and 2. Consider light from a target 10 as it is focused on a n×n pixel photodetector array 12 by a diffractive lens or mirror 11. The term "diffractive lens or mirror" as used herein, means a diffractive optical element that disperses either transmitted light (a lens) or reflected light (a mirror). Reflective diffractive elements include diffraction gratings which are planar (usually glass) plates with fine lines or rulings etched or scratched onto the surface thereof in densities of about 700–18,000 lines per centimeter. At long ranges the target 10 appears as an unresolved point which subtends a single pixel 16 at the photodetector array 12. At shorter ranges, the target 10 resolves and covers multiple pixels. The diffractive lens in the image multispectral sensing (IMSS) apparatus of the present invention has the property that one wavelength band is in focus at a time in the plane of the photodetector array for a particular focal length. Wavelengths of a narrow spectral band from a target at infinity are focused on a single pixel 16, while all other wavelengths are smeared into a multiple pixel blur with a gradual graded structure as shown in FIG. 2(b). By changing the focal length, a different wavelength, if present, comes into focus on the photodetector array. Since the only finely focused objects in the field of view are those with a spectral signature at the wavelength corresponding to the current lens/focal plane spacing, by modulating or stepping the lens/focal plane spacing and recording the image for each value of the lens/focal plane spacing, sequential spectral images are made.

Returning to FIG. 1, two spectral bands, $\lambda_1$ (red) represented by the solid line, and $\lambda_2$ (blue) represented by the dotted line, are used for illustrative purposes. The solid state photodetector array 12 having a total area A consisting of n by n elements or pixels 16 with a center-to-center detector element spacing of x is shown. The clear aperture diameter of the diffractive lens 11 is $D_A$ and is shown near the far left of the figure. The focal length of the system when tuned for red light is $f_r$, and the total length of the system when tuned for blue light is $f_b$. Thus, $\Delta = f_b - f_r$ is the difference in focal length between the red and blue wavelengths The diffraction limited blurred diameter, which is the diameter of the red light in focus at half peak height, is $d_0$. It is important for the spatial filtering algorithm, that $d_0$ be smaller than the diameter of one pixel. When the optical path length is changed to the position of the focal length for the blue light, $f_b$, the blurred diameter of the red light becomes $d_n$, which is much larger than the diameter of one pixel. At this point, the blue light is in focus and the diffraction limited, blurred diameter of the blue light is $d_b$ ($\sim d_o$), again smaller than one pixel. A pixel with a focused monochromatic spot will also detect broad band radiation, however, the majority of the signal will come from the focused spot.

If the diffractive lens 11 is moved in the direction of the optical axis OA, different wavelengths sequentially come into and out of focus on the photodetector array 12, generating sequential images at different wavelengths. The output of individual pixels 16 in the photodetector array 12 and the position of the lens with respect to the photo detector array which corresponds to the pixel output are stored in a signal processor 14. The signal processor 14 uses a spatial filtering algorithm to build up the in-focus image of each "frame" of data from the photodetector array. A "frame" corresponds to the photodetector array output for a single lens-photodetector array distance. The unfocused image will be subtracted out leaving substantially only the signal from the focused component of the image. By tracking the intensity of the individual pixels in the image synchronously with the frame rate of the photodetector array, the spectra or "color signature" of all objects in the image are generated. The background clutter will have a smoothly changing type spectrum, while individual targets within the image will have fine spectral signature and are thereby easily differentiated from the background clutter. The function of the n×n photosensitive elements 16 of the detector array 12 is to detect the spectrally filtered light from targets within an image. Only those pixels having an output very different from the output of neighboring pixels remain after passage through the signal processor 14. The processed signal from such pixels represent light received from either (a) a single target in the image if the target is small or (b) an edge of the target if the target is large. The rest of the image is ignored thus reducing the amount of data that is processed by the spectral correlator 15. The spectral correlator 15, compares the spectral signature of the image or targets within the image with a library of known target signatures for purposes of identification.

A fundamental property of diffractive lenses which serves as the basis for IMSS is that the focal length of a diffractive lens varies inversely with the illumination wavelength, i.e. $f(\lambda) = \lambda_0 \, f/\lambda$. A diffractive lens is more dispersive than any known glass lens and the dispersion has the opposite sign. Thus, if an image detector is located at a distance $f(\lambda_1)$ behind the lens, objects with emission wavelength $\lambda_1$ will be in sharp focus, whereas objects at other wavelengths will be significantly defocused. The defocused images from the other wavelength components can be subtracted out using image processing techniques described earlier. If the image detector is moved to a distance $f(\lambda_2)$ behind the lens, distant objects with emission wavelength $\lambda_2$ will be in sharp focus. Hence, by varying the distance between the diffractive lens and the detector, one can obtain the spectrum for each object contained within the field of view.

In FIGS. 2(a) and 2(b), we see the spectral resolution possible from the use of IMSS using the present invention. In FIG. 2(a) the intensity is plotted as a function of position along the photo detector array for several different wavelengths from $\lambda 1$ to $\lambda 4$. As can be seen in FIGS. 2(a) and 2(b), $\lambda 1$ is in focus such that the majority of the radiation falls on a single pixel 21 of the photodetector array 12. Even though the primary wavelength $\lambda 1$ is in focus, radiation from adjacent wavelength bands, $\lambda 2$–$\lambda 4$, contribute to the total energy falling on a pixel. However, the focused light has a stronger signal in one pixel as compared to the neighboring pixels.

Figure 8:
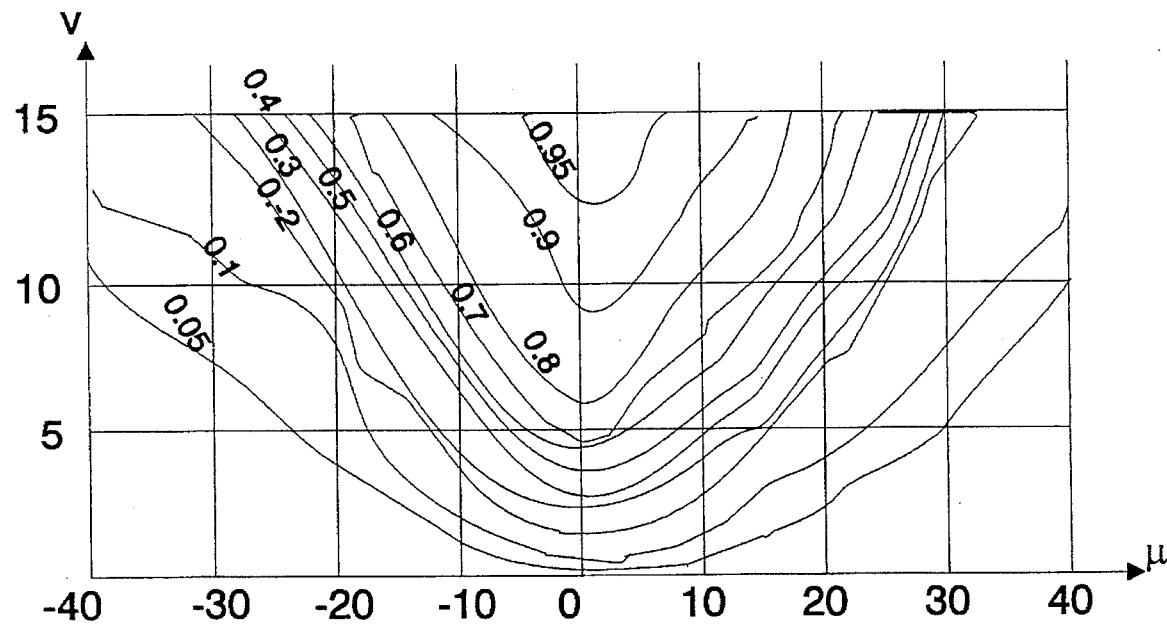
FIG. 8 shows contour lines giving the fraction of the total light intensity which falls within small circles (v) centered on the optical axis for various distances (u) between the lens and the focal plane.

The spectral resolution of IMSS can be thought of as the ratio of the amount of in-band radiation to the amount of out-of-band radiation falling on a pixel. An analytic derivation of the spectral resolution can be found in diffraction theory (See, for example, E. Wolf, Proc. Roy. Soc. (A) 204,542 (1975)). FIG. 8 is a plot showing the contour lines of the radiant intensity in a scaled coordinate system of u and v where:

$$u = \frac{\pi}{2\lambda_0} \frac{\Delta}{f/\#_0^2} \tag{1}$$

$$v = \frac{r\pi\#_0}{\lambda_0 f} \tag{2}$$

Both u and v are dimensionless parameters wherein u is related to a position along the optical axis through $\Delta$ and v is related to a position perpendicular to the optical axis through r. $\Delta$ is the actual translation along the optical axis to change the in-focus spectral band. f/# is the f-number of the lens. Solving equation (1) for $\Delta$ gives:

$$\Delta = \frac{2u}{\pi} \lambda_0 f/\#_0^2 \tag{3}$$

if u is equal to $2\pi$ then:

$$\Delta = 4\lambda_0 f/\#_0^2 \tag{4}$$

which is the equation for the geometric depth of focus. In equation (2) r is the radius of the blur circle containing x % of the in focus light. Solving equation (2) for r gives:

$$r = \frac{v}{\pi} \lambda_0 f/\#_0 \tag{5}$$

and if v is equal to $1.22\pi$, then:

$$r = 1.22 \lambda_0 f/\#_0 \tag{6}$$

which is the equation for the geometric diffraction limited blur circle radius.

The spectral resolution of the IMSS is a function of the incident wavelength, the focal length, the pixel size, the f-number and the ratio of the dimensionless parameters u and v. It is given by the following equation:

$$\Delta\lambda = \frac{\text{pixel size } f/\#_1 \lambda_1}{f_2} \frac{u}{v} \tag{7}$$

The derivation of equation (7) is as follows: by definition the fundamental equation for diffractive lens is:

$$f_1 = \frac{\lambda_2}{\lambda_1} f_2 \text{ and } f_2 = \frac{\lambda_0}{\lambda_2} f_0 \tag{8}$$

Referring to FIG. 1

$$\Delta = f_2 - f_1 = f_0 \lambda_0 \frac{\lambda_1 - \lambda_2}{\lambda_1 \lambda_2} \tag{9}$$

$$\Delta\lambda = \lambda_1 - \lambda_2 \text{ and therefore, } \Delta = \frac{f_0 \lambda_0 \Delta\lambda}{\lambda_1 \lambda_2} \tag{10}$$

from equation (3)

$$\Delta = \frac{2u}{\pi} \lambda_0 f/\#_0^2 \tag{11}$$

substituting from equation (5) for v $$\Delta = 2r f/\#_0 \frac{u}{v} \tag{12}$$

let 2r equal pixel size; then $$\Delta = \text{pixel size } f/\#_0 \frac{u}{v} \tag{13}$$

equating (10) and (13)

$$\frac{\lambda_0 f_0 \Delta\lambda}{\lambda_0 \lambda_1} = \text{pixel size } f/\#_0 \frac{u}{v} \tag{14}$$

$$\Delta\lambda = \frac{\text{pixel size } f/\#_1 \lambda_1 \lambda_2}{\lambda_0 f_0} \frac{u}{v}$$

let $\lambda_2 = \lambda_0$ then:

$$\Delta\lambda = \frac{\text{pixel size } f/\#_0 \lambda_1}{f_0} \frac{u}{v}$$

$\Delta$ can be considered the depth of focus. Another way to define the spectral resolution of IMSS is $$\Delta\lambda = \frac{\Delta\lambda_1}{f_0} \qquad (15)$$

from equation 15 we see that the spectral resolution of the IMSS is directly proportional to the depth of focus and the wavelength of incident radiation and inversely proportional to the focal length.

The instantaneous field of view, IFOV is given by:

$$IFOV_0 = \frac{\text{pixel size}}{f_0} \qquad (16)$$

Therefore, the spectral resolution can be written as:

$$\Delta\lambda = IFOV_0 f/\#_0 \lambda_1 \frac{u}{v} \qquad (17)$$

The finest spectral resolution can be achieved by using small pixel sizes, i.e., small IFOV and long focal length lenses. The longer the focal length lens, i.e., the narrower the instantaneous field of view, the finer the spectral resolution of the IMSS system.

Figure 3A:
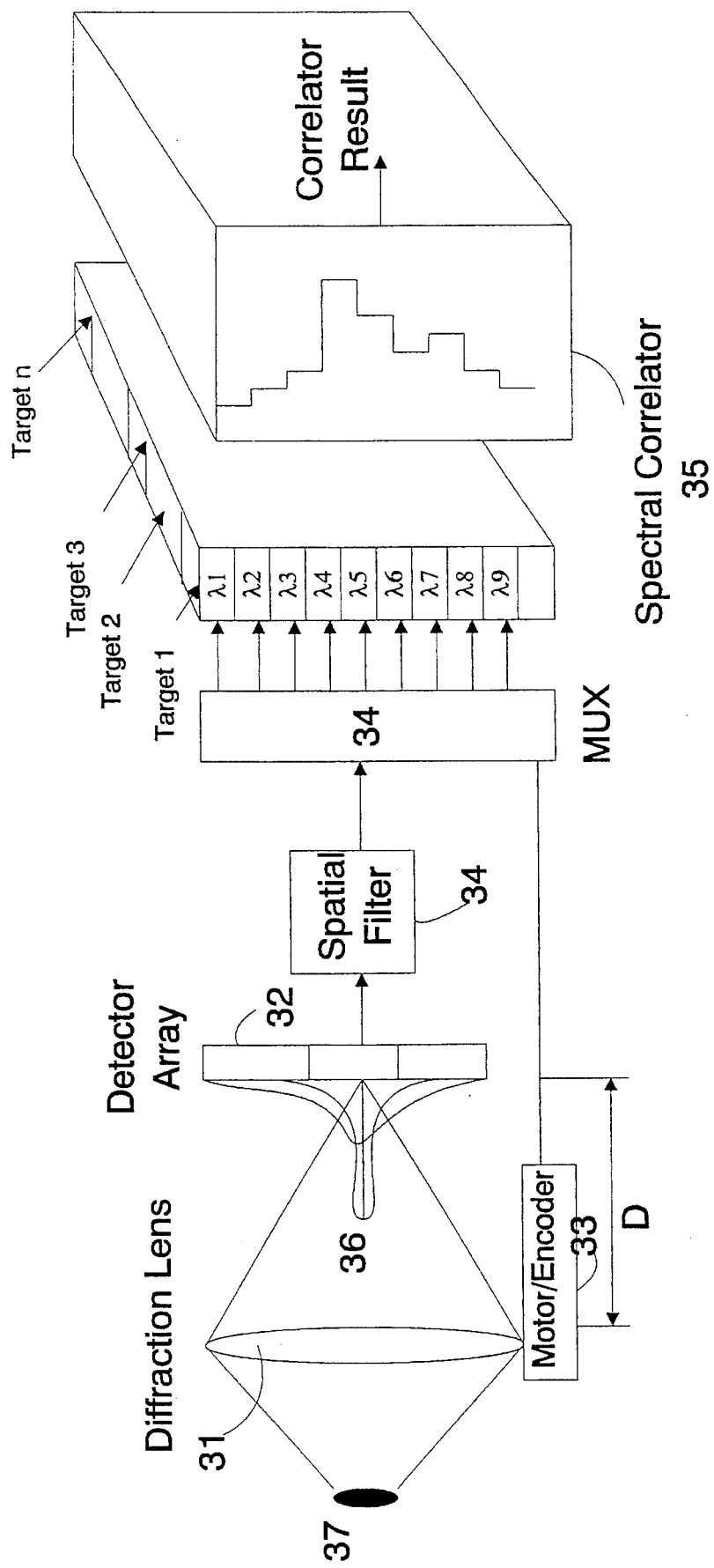
FIG. 3A is a schematic diagram of the IMSS spectrophotometer of the present invention.

A schematic diagram of a preferred embodiment of the present invention is shown in FIG. 3A. The apparatus comprises a diffractive lens 31, a photodetector array 32, a motor with a position encoder 33, a signal processor 34 and a spectral correlator 35. Light 36 from a remote target 37 is focused by the diffractive lens or mirror 31 onto the photodetector array 32. The distance of the photodetector array 32 from the lens 31 is controlled by means of a stepper motor, piezoelectric translation device or other such translating means 33 as is appropriate for the wavelength range. The distance D is read by the signal processor 34 which simultaneously reads the output of each pixel (not shown) in the photodetector array 32. Thus, for every value of D, which corresponds to a focal distance for a particular color, different spectral components of L the image will be brought into focus on the photodetector array 32. The spectral components of targets 1 through n in the image are recorded for each value of D. Recordings for each position D comprise a single frame. In the example shown there is only a single target. The spectral components of the light L emanating from the target shown as $\lambda 1 - \lambda 9$ FIG. 3A may be compared with spectral components of known targets in a spectral correlation 35. The correlation 35 permits identification of the target 37.

Figure 3B:
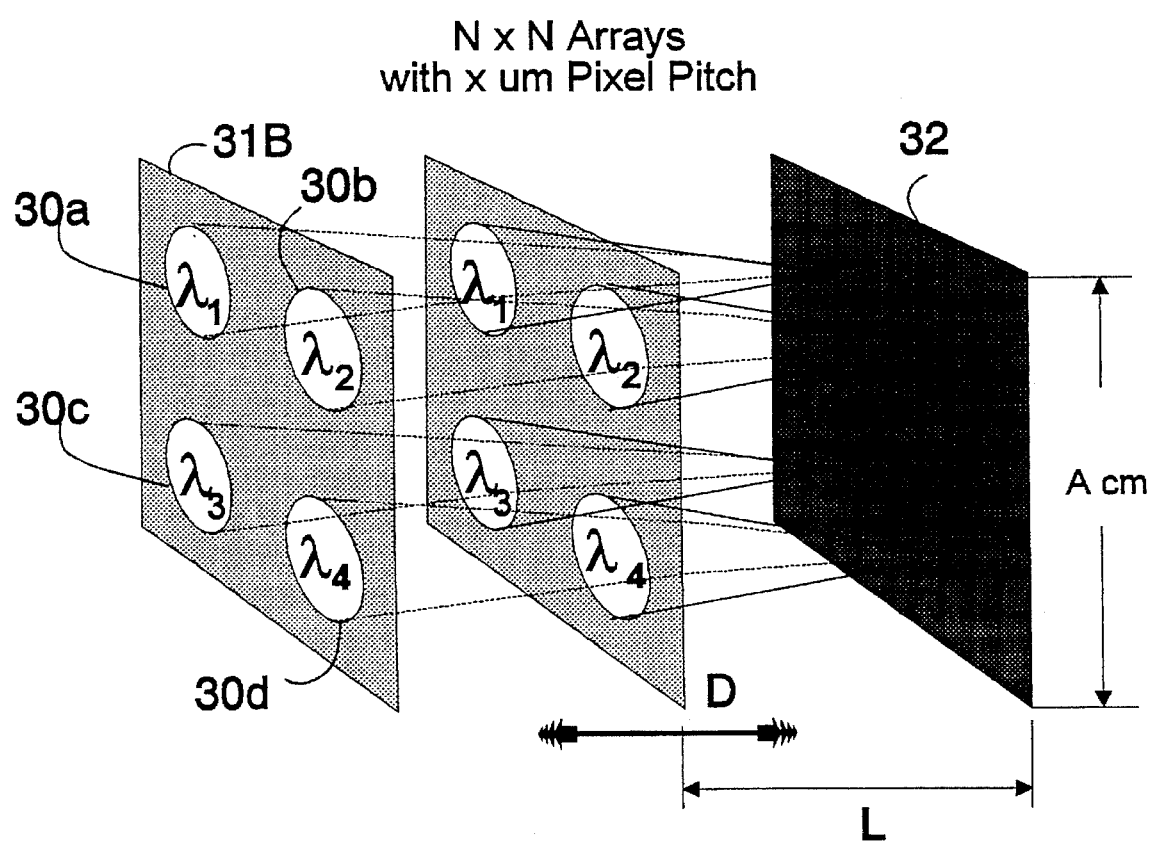
FIG. 3B shows a second preferred embodiment of the present invention employing an array of lenslets as a diffractive optical element.
Figure 4:
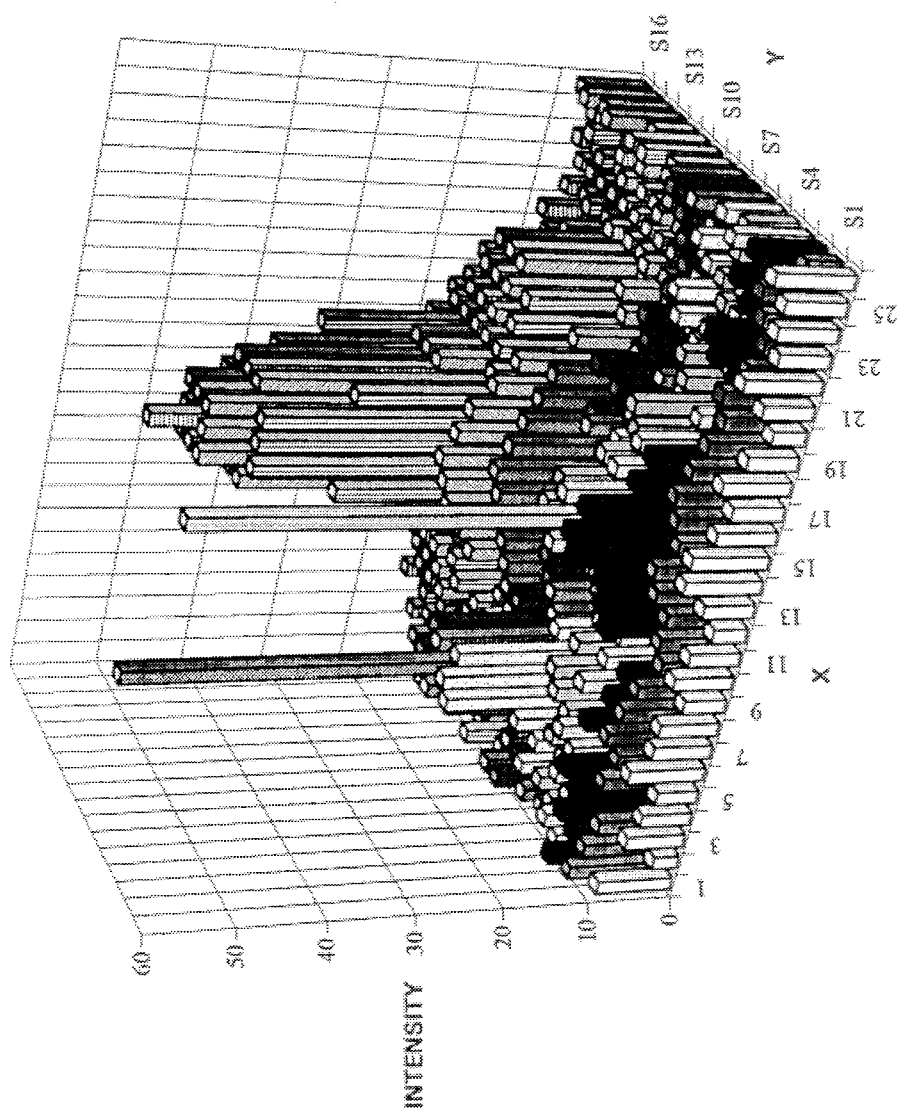
FIG. 4 is a computer simulation of the output image of the various pixels in the detector array from an actual scene comprising two point-like targets.
Figure 5:
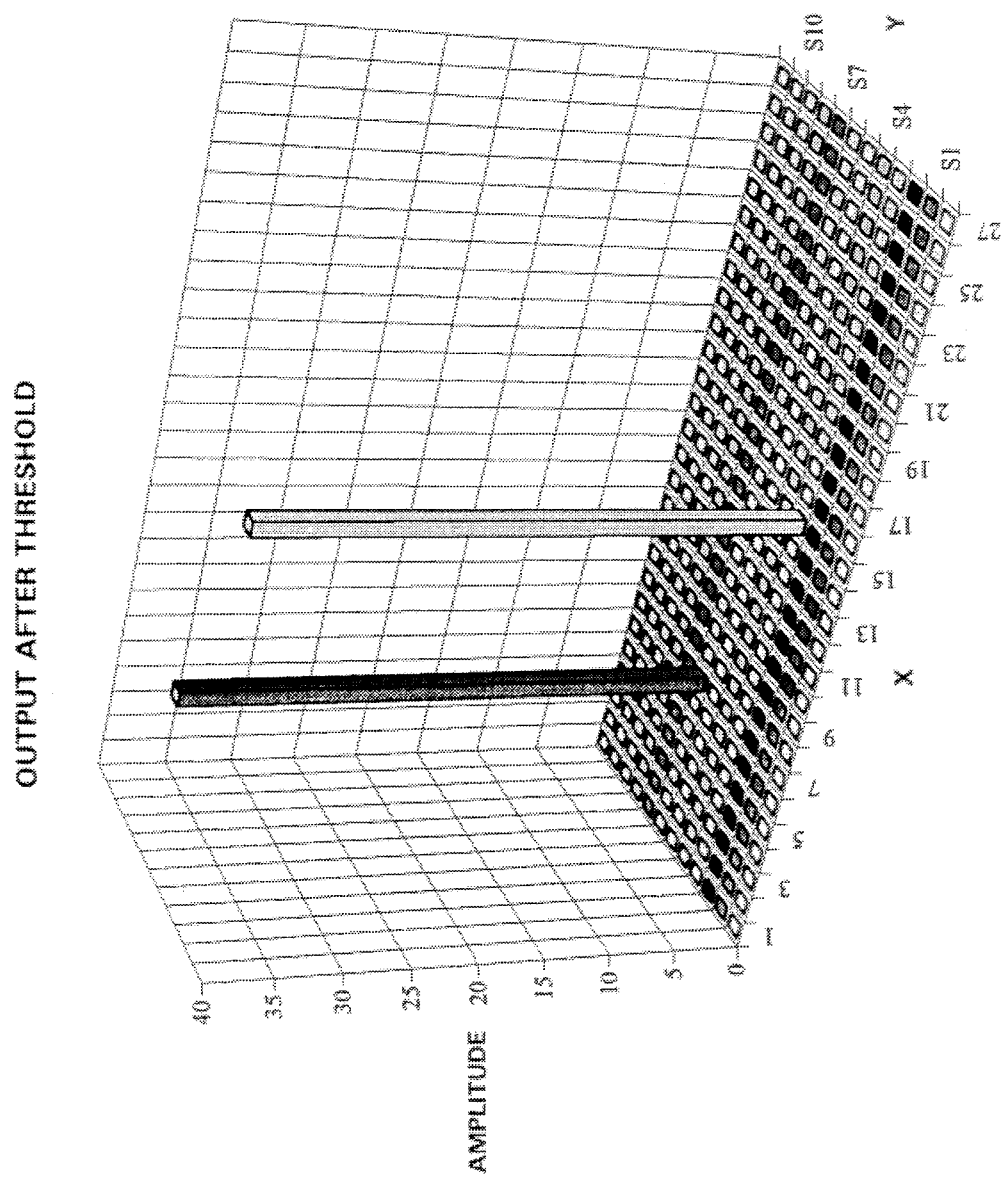
FIG. 5 is a computer simulation of one spectral line output from a generalized image with two targets.
Figure 6:
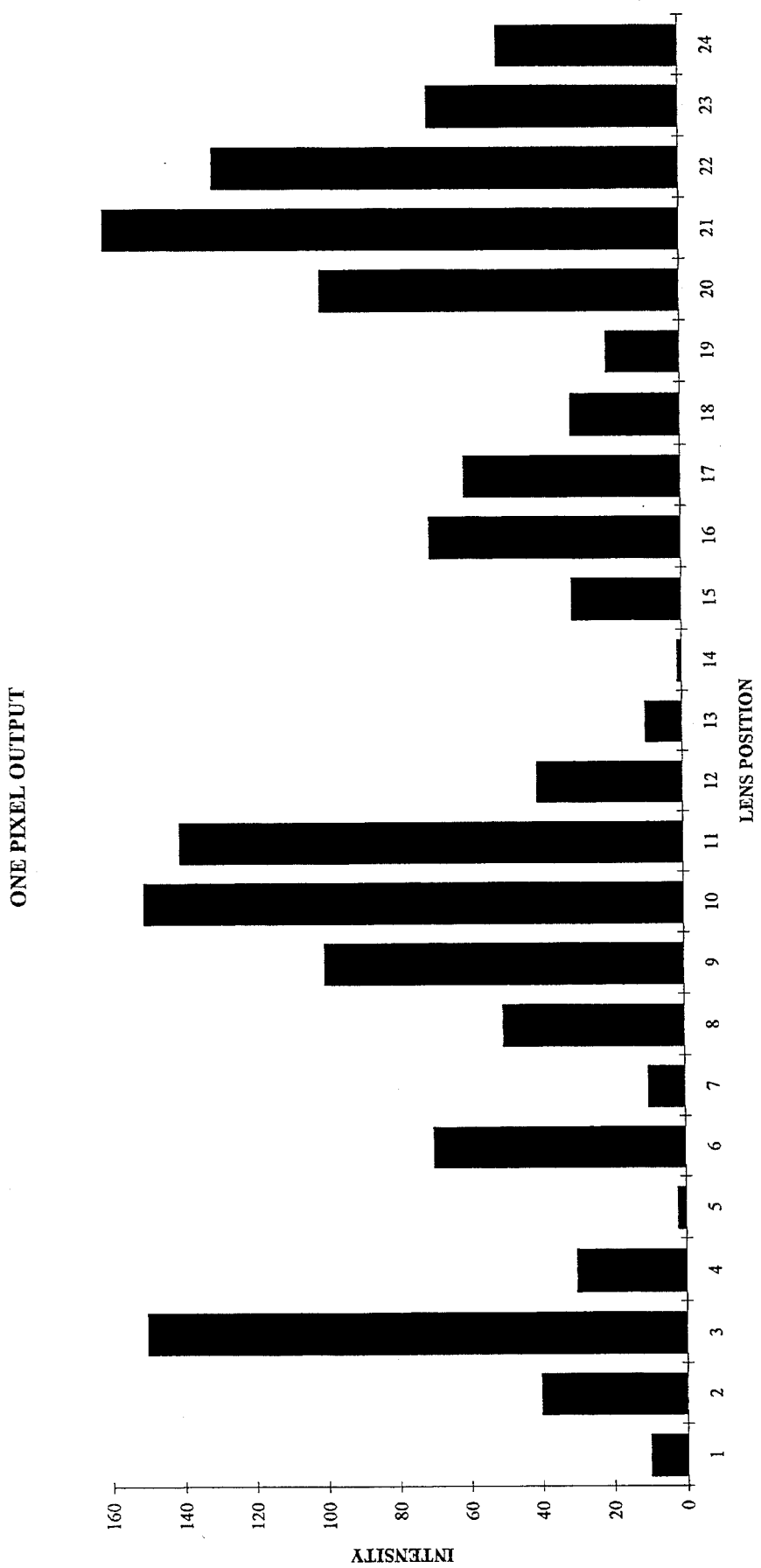
FIG. 6 shows the variation in light output from a single pixel in the photodetector array as a function of the distance of the diffractive lens (or mirror) from the photodetector array.
Figure 7:
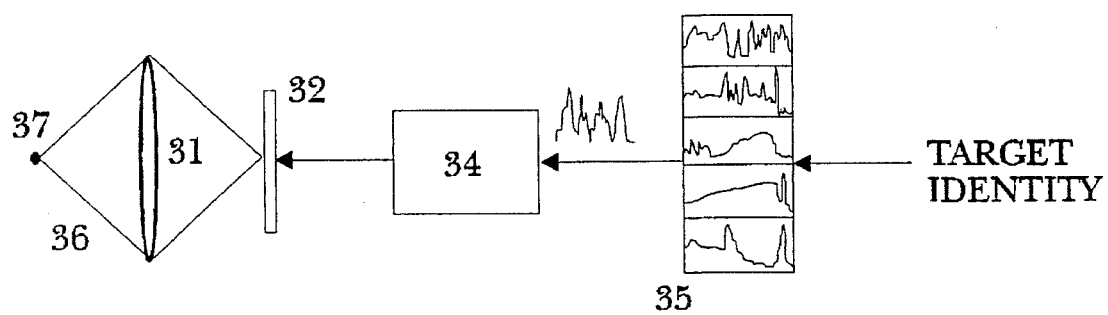
FIG. 7 demonstrates the application of image multispectral sensing (IMSS) to target recognition.

FIG. 3B is an example of a different embodiment of the IMSS device in accordance with the present invention. In this figure there are four different diffractive optical elements or lenslets, 30a–d, all affixed to a unitary planar surface 31B. Each of the lenslets can be a blazed grading configured as a lens or as a mirror, with each lenslet having the same focal length but tuned for different peak wavelength response. As an example $\lambda_1$ might be tuned for 4.0 µm, $\lambda_2$ tuned for 4.2 µm, $\lambda_3$ tuned for 4.4 µm etc. In this fashion for a fixed focal position there will be four different wavelength images on the detector array 32; each in a different quadrant. This embodiment of the IMSS device will give multiple spectral images without modulation of the dispersive optical element (DOE) 31B- detector array 32 spacing. However, this same DOE 31B with multiple lenslets 30a–d configured thereon can be translated along the axis indicated by the broad arrow D to cover the wavelength in between $\lambda_1$ and $\lambda_2$ etc. There is no limit to the number of lenslets 30a–d or mirrorlets (not shown) that can be configured on a single DOE.

As stated earlier the solid state sensor 22 is electronically scanned and the signal is processed to filter out all portions of the image that extend over more than one pixel. Therefore, at the position of $f_r$ only in-focus objects (or edges) with spectral content of red light will pass through the filter and likewise at the position of $f_b$ only in-focus objects with the spectral content of blue light will pass through the filter. A modulation of the focal length along with point and edge spatial filtering for each focal length will give spectral information for all in the field of view. There are several ways to vary the distance between the lens and the photodetector array. One possible approach is to use a piezoelectric driven mirror in the optical path. Velocities of 160 millimeters per second is practical with this approach. As mentioned earlier, stepper motors or pneumatic hydraulic devices can also be employed for changing the distance between the diffractive focusing element and the photodetector array.

In view of the foregoing, and in light of the objectives of the invention, it will be apparent to those skilled in the art that the subject matter of this invention is capable of variation in its detail, and I do not therefore desire to be limited to the specific embodiment selected for purposes of explanation of the invention. The foregoing has been merely a description of one embodiment of the imaging spectrophotometer. Instead, the scope of the applicant's invention can be determined by the claims appended hereto.

What I claim is:

1. An apparatus for measuring the spectral composition of an image comprising:

(a) a diffractive element for dispersing spectral components of an image and directing said spectral components into a volume having a cross-sectional area A and a length L;

(b) a photodetector array comprising a planar surface having a plurality of discrete light detectors deployed thereupon, said photodetector array having an area substantially equal to A; and (c) means for changing the distance between said diffractive element with respect to said photodetector array in the direction of L;

(d) means for measuring and storing the distance between said diffractive element and said photodetector array;

(e) means for measuring and storing the intensity of spectral components of the image which impinge upon said photodetector array;

and wherein said spectral composition of said image is determined by computing the intensity of the spectral components impinging upon said photodetector array as a function of the distance between the diffractive element and the photodetector array.

2. The apparatus of claim 1 wherein said diffractive element is a diffractive lens.

3. The apparatus of claim 1 wherein said diffractive element is a diffractive mirror.

\* \* \* \* \*